US009003810B2

(12) United States Patent
Porte et al.

(10) Patent No.: US 9,003,810 B2
(45) Date of Patent: Apr. 14, 2015

(54) AIRCRAFT COVER INCLUDING MEANS FOR LIMITING THE SCOOP PHENOMENA OF PNEUMATIC TYPE

(75) Inventors: Alain Porte, Colomiers (FR); Frederic Chelin, Encausse (FR); Thierry Surply, Cornebarrieu (FR)

(73) Assignee: Airbus Operations (S.A.S.), Toulouse (FR)

( * ) Notice: Subject to any disclaimer, the term of this patent is extended or adjusted under 35 U.S.C. 154(b) by 722 days.

(21) Appl. No.: 13/276,495

(22) Filed: Oct. 19, 2011

(65) Prior Publication Data

US 2012/0097261 A1 Apr. 26, 2012

(30) Foreign Application Priority Data

Oct. 26, 2010 (FR) ..................................... 10 58784

(51) Int. Cl.
*F02C 7/20* (2006.01)
*B64D 27/00* (2006.01)
*B64D 29/08* (2006.01)
*B64D 29/06* (2006.01)
*F01D 25/24* (2006.01)

(52) U.S. Cl.
CPC ................ *B64D 29/08* (2013.01); *F01D 25/24* (2013.01); *F02C 7/20* (2013.01); *B64D 29/06* (2013.01)

(58) Field of Classification Search
CPC ........ B64D 29/06; B64D 29/08; F01D 25/24; F02C 7/20
USPC ......................................... 60/796; 244/54, 55
See application file for complete search history.

(56) References Cited

U.S. PATENT DOCUMENTS

| 2,319,843 | A | * | 5/1943 | Berlin et al. ................. 123/41.7 |
| 3,040,524 | A | * | 6/1962 | Kurti ............................ 60/226.2 |
| 7,204,458 | B2 |   | 4/2007 | Porte et al. |
| 2006/0038410 | A1 | * | 2/2006 | Pratt et al. ..................... 292/144 |
| 2010/0992540 |   |   | 8/2010 | Andre et al. |
| 2010/0224060 | A1 | * | 9/2010 | Nemenoff et al. ............. 91/436 |
| 2011/0114796 | A1 | * | 5/2011 | Porte et al. .................. 244/53 B |
| 2011/0116916 | A1 |   | 5/2011 | Porte et al. |

FOREIGN PATENT DOCUMENTS

EP 0631554 B1 * 1/1996
EP 0596070 B1 * 5/1996

(Continued)

OTHER PUBLICATIONS

French Search Report dated Jun. 9, 2011, corresponding to Foreign Priority Application No. 1058784.

*Primary Examiner* — William H Rodriguez
*Assistant Examiner* — Rene Ford
(74) *Attorney, Agent, or Firm* — Young & Thompson

(57) ABSTRACT

An aircraft nacelle includes at its outside wall a cowl moveable relative to the nacelle so as to block or unblock an opening. The cowl includes an articulation and locking/unlocking elements distant from the upstream edge of the cowl that include elements for limiting the appearance of scooping phenomena. The limiting elements include at least one lock integral with the rest of the nacelle or respectively the cowl that can occupy a locked state in which part of the lock interferes with the cowl or respectively the rest of the nacelle and prevents a deformation that includes a radial component of the cowl, and another free state in which the part no longer interferes with the cowl or respectively the rest of the nacelle and allows the opening movement of the cowl, with the switch from one state to the next being generated by a gas pressure variation.

10 Claims, 4 Drawing Sheets

(56) References Cited

FOREIGN PATENT DOCUMENTS

Figure 1:
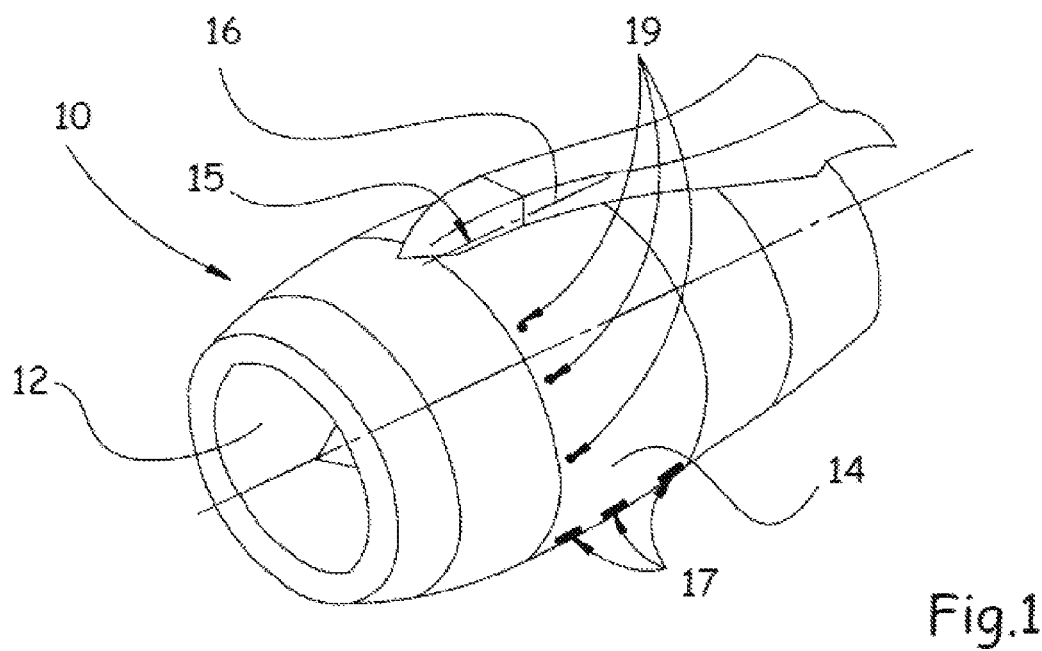

| EP | 1 336 707 | | 8/2003 |
| EP | 2222560 | B1 * | 11/2011 |
| EP | 2399827 | A2 * | 12/2011 |
| FR | 2726600 | A1 * | 5/1996 |
| FR | 2 933 957 | | 1/2010 |
| FR | 2 939 410 | | 6/2010 |
| FR | 2960854 | A1 * | 12/2011 |
| WO | WO 2013081910 | A1 * | 8/2013 |

* cited by examiner

AIRCRAFT COVER INCLUDING MEANS FOR LIMITING THE SCOOP PHENOMENA OF PNEUMATIC TYPE

This invention relates to an aircraft cowl that incorporates means for limiting pneumatic-type scooping phenomena.

An aircraft propulsion system comprises a nacelle in which a power plant that is connected by means of a mast to the rest of the aircraft is arranged in an essentially concentric manner.

The nacelle comprises an inside wall that delimits a pipe with an air intake at the front, with a first part of the incoming air stream, called the primary stream, passing through the power plant to take part in the combustion process, and with the second part of the air stream, called the secondary stream, being entrained by a fan and flowing into an annular pipe that is delimited by the inside wall of the nacelle and the outside wall of the power plant.

The nacelle also comprises an outside wall with an essentially circular cross-section that extends from the air intake to the aft exhaust, constituted by the juxtaposition of several elements, an essentially rigid air intake at the front followed by nacelle doors, also called cowls.

The air intake is rigid because of its curved shapes and numerous reinforcements for withstanding forces generated by the aerodynamic flows or possible shocks.

The cowls are made mobile to allow access to the power plant that is placed in the interior of the nacelle. These cowls are articulated with the rest of the nacelle in different manners based on the kinematics adopted, and they extend from the top of the nacelle, close to the anchoring of the mast, up to the bottom of the nacelle, and have a semi-cylindrical shape.

A cowl generally comprises a piece of sheet metal with stiffeners on the inside surface to impart a relative rigidity thereto. The smooth outside surface of the cowl is sensitive to remaining in the extension of the outside surface of the other elements, in particular of the air intake, when the cowl is in the closed position.

Locking means are provided at the lower edge of the cowl so as to keep the cowl in the closed position.

In addition, the frame of the opening that is blocked by the cowl comprises—on at least a part of its periphery—a contact surface against which the cowl can rest in such a way as to always keep its outside surface in the extension of that of the air intake.

Optionally, the contact surface of the frame can comprise a deformable element such as a compressible joint.

To ensure a positioning of the cowl relative to the rest of the nacelle along the longitudinal axis that also corresponds to the pivoting axis of the cowl, and at the upstream and downstream edges (perpendicular to the pivoting axis) of the frame of the opening, it is possible to provide shapes that complement the shapes provided at the upstream and downstream edges of the cowl. Thus, the upstream (and/or downstream) edge of the frame comprises a groove, and the upstream (and/or downstream) edge of the cowl comprises a projecting shape that is housed in the groove that is provided at the frame. These elements make it possible to guide the cowl during its closing in such a way that it is correctly positioned along the pivoting axis when it is closed.

During flight, considering their relative rigidities, the cowls can become deformed, in particular in the radial direction, although the air can penetrate under said cowls into the interior of the nacelle at the junction with the air intake. This scooping phenomenon reduces the aerodynamic performance levels of the aircraft, in particular by increasing the drag, which is manifested as excessive fuel consumption.

So as to limit this phenomenon, one approach consists in increasing the number of stiffeners provided at the cowls. However, this approach goes against the desired result to the extent that the addition of stiffeners contributes to increasing the on-board weight and therefore the consumption of the aircraft.

According to another alternative, it is possible to provide a belt system as illustrated in the patent application FR-2,933,957.

This invention proposes an alternative to the approaches of the prior art that limits the scooping phenomena, without significantly increasing the on-board weight and the maintenance costs.

For this purpose, the invention has as its object an aircraft nacelle that at its outside wall comprises a cowl that can move relative to the rest of the nacelle in such a way as to block or unblock an opening, whereby said cowl comprises an articulation relative to the rest of the nacelle and locking/unlocking means distant from the upstream edge of said cowl that comprises means for limiting the appearance of scooping phenomena, characterized in that said means for limiting the appearance of the scooping phenomenon comprise at least one lock that is integral with the rest of the nacelle or respectively the cowl that can occupy a so-called locked state in which a part of the lock interferes with the cowl or respectively the rest of the nacelle and prevents a deformation that comprises a radial component of said cowl and another so-called free state in which said lock part no longer interferes with the cowl or respectively the rest of the nacelle and allows the opening movement of said cowl, with the switch from one state to the next being generated by a pressure variation of a gas.

Figure 2A:
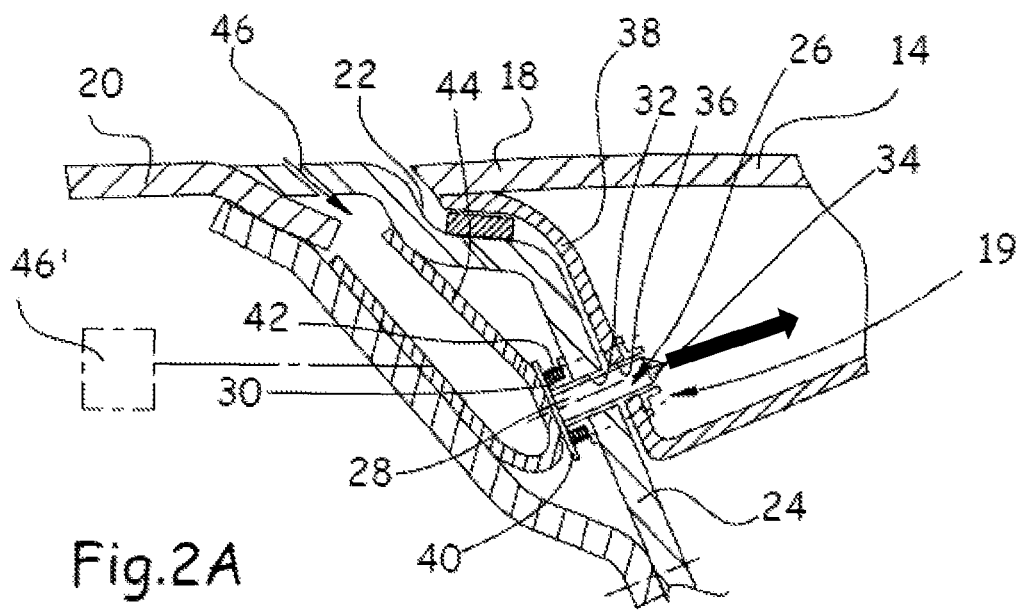
Figure 2B:
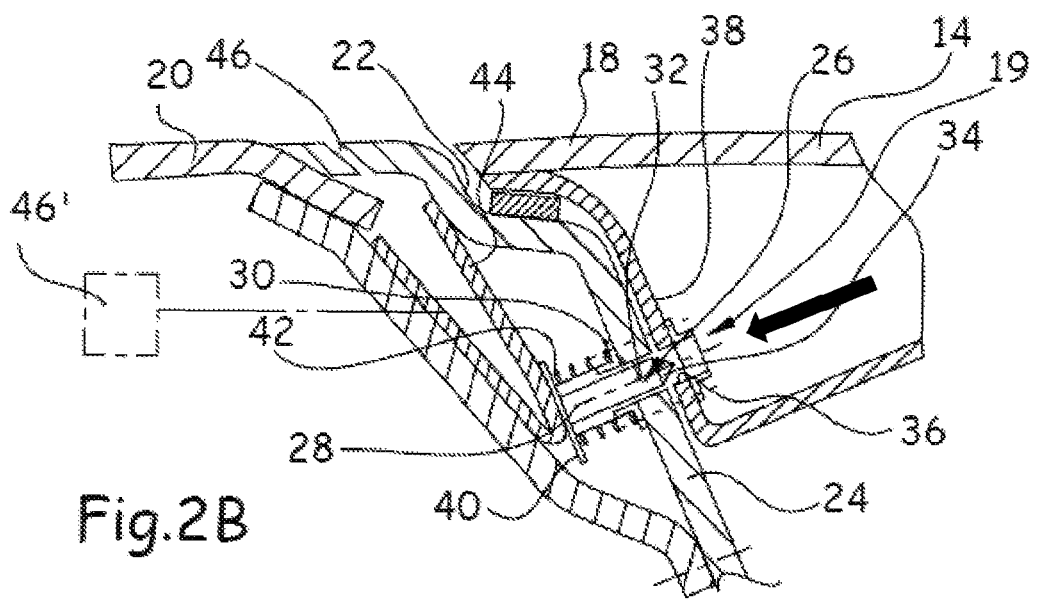
Figure 3:
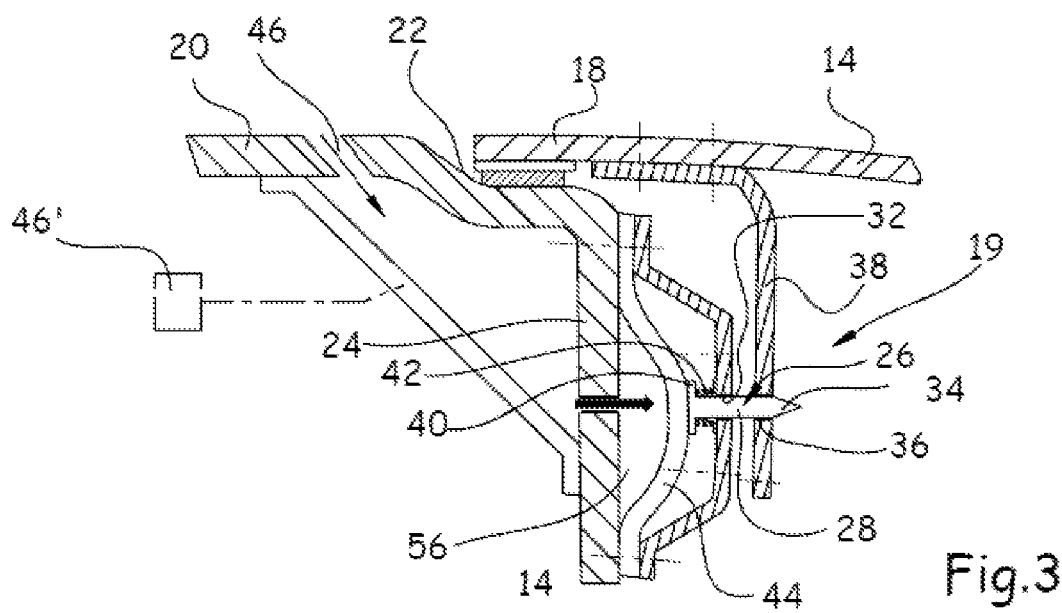
Figure 4:
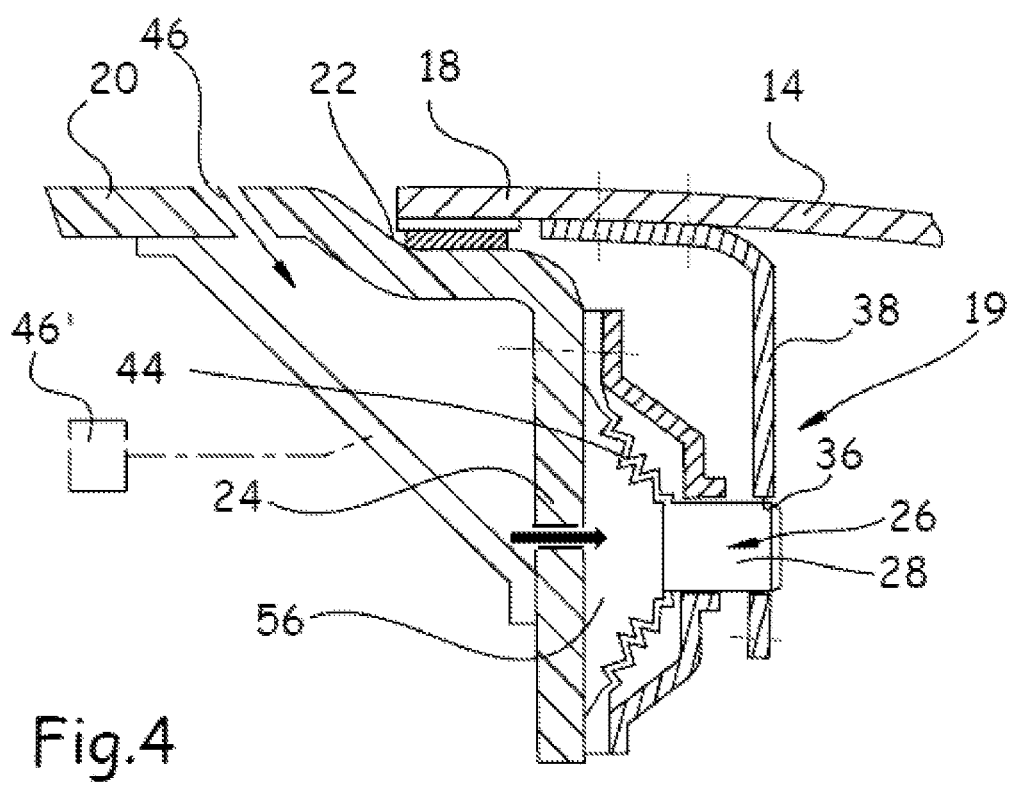
Figure 5:
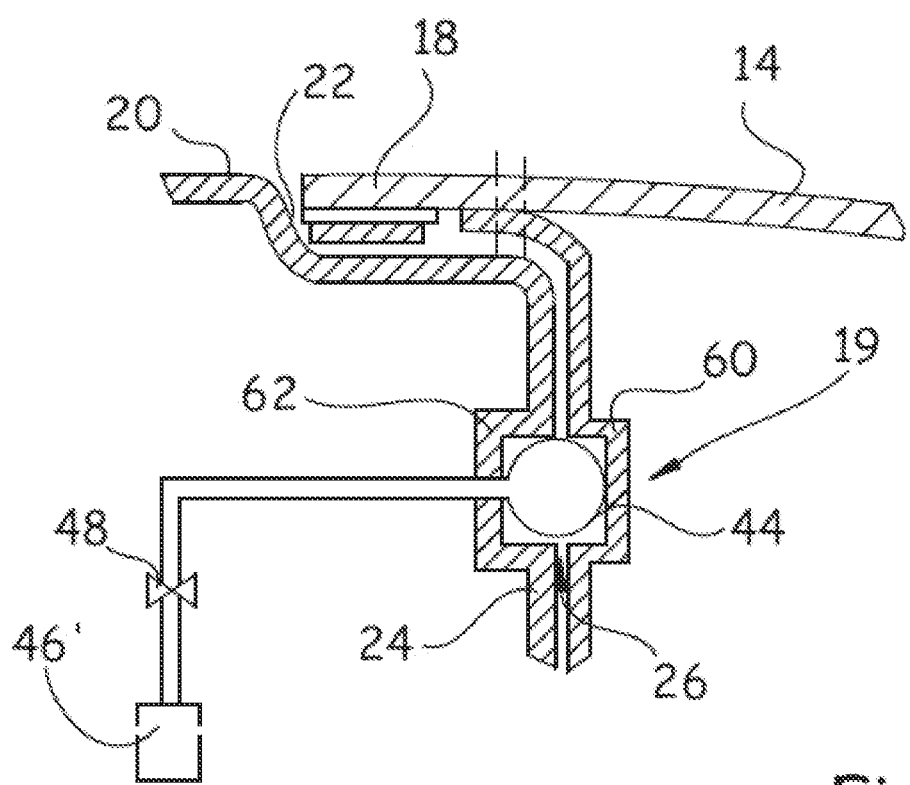

Other characteristics and advantages will emerge from the following description of the invention, a description that is provided only by way of example, relative to the accompanying drawings in which:

FIG. 1 is a perspective view that illustrates an aircraft nacelle,

FIG. 2A is a cutaway that illustrates the upstream edge of a cowl of an aircraft nacelle according to a first variant of the invention in the locked state, FIG. 2B is a cutaway that illustrates the upstream edge of a cowl of an aircraft nacelle according to a first variant of the invention in the free state, FIG. 3 is a cutaway that illustrates the upstream edge of a cowl of an aircraft nacelle according to another variant of the invention in the locked state, FIG. 4 is a cutaway that illustrates the upstream edge of a cowl of an aircraft nacelle according to another variant of the invention in the locked state, and FIG. 5 is a cutaway that illustrates the upstream edge of a cowl of an aircraft nacelle according to a simplified variant of the invention in a locked state.

FIG. 1 shows a nacelle 10 that contains a power plant and is connected to the rest of the aircraft by a mast. It comprises an outside wall with an essentially circular cross-section that extends from an air intake 12 to an aft exhaust, constituted by the juxtaposition of several elements, with an essentially rigid air intake 12 at the front followed by nacelle doors 14, also called cowls.

The cowls 14 comprise an articulation 15 relative to the rest of the nacelle 10 to make them mobile and to allow access to the power plant. Thus, these cowls 14 make it possible to block or unblock an opening that is delimited by a frame.

These cowls 14 are articulated with the rest of the nacelle in different manners based on the kinematics adopted, and they extend from the top of the nacelle, close to the anchoring of the mast, to the bottom of the nacelle, and have a semi-cylindrical shape.

A cowl 14 generally comprises a piece of sheet metal with stiffeners on the inside surface to impart a relative rigidity thereto. The smooth outside surface of the cowl is sensitive to remaining in the extension of the outside surface of the other elements, in particular of the air intake, when the cowl is in the closed position.

Hereinafter, the longitudinal direction corresponds to the direction of the axis of rotation of the fan of the power plant. A vertical median plane corresponds to a vertical plane that contains the longitudinal axis.

A radial direction is a direction that is perpendicular to the longitudinal direction.

A tangential plane at a given point corresponds to a plane that is perpendicular to the radial direction that passes through said point.

The upstream and downstream positions are defined with reference to the direction of the flow of gases inside the power plant.

According to one embodiment, a nacelle comprises two cowls 14 that are symmetrical relative to the vertical median plane of the nacelle, with each cowl being able to pivot around an axis of rotation 16 that is oriented in the longitudinal direction and arranged close to the mast (approximately at 12 o'clock).

Thus, the cowls 14 can occupy several states, namely a closed state in which the outside surfaces of the cowls are arranged in the extension of the surfaces of the parts of the nacelle that are upstream and downstream from the cowls, and an open state in which the cowl is pivoted and allows access to the power plant.

The lower edges of the cowls are essentially parallel to the pivoting axes 16 and are connected to one another in the closed state by locking/unlocking means 17.

The nacelle, the cowl(s), and the articulation of the cowl relative to the rest of the nacelle, and the locking/unlocking means of the cowl are not described in more detail because they are known to one skilled in the art.

The upstream and downstream edges of the cowl connect the lower and upper edges of the cowl.

These upstream and downstream edges work with the upstream and downstream edges of the frame of the opening. Positioning and guiding means can be provided to position the upstream (or downstream) edge of the cowl correctly with the upstream (or downstream) edge of the opening, for example a V-shaped groove at the edge of the opening that works with a slot that is provided at the edge of the cowl or blades provided at the edge of the cowl that work with housings provided at the edge of the opening.

The positioning means make it possible to ensure the positioning of the cowl in the direction of the pivoting axis 16 of the cowl. The invention is not limited to these embodiments. Other approaches can be considered for positioning the cowl relative to the opening.

In all cases, to allow the opening and the closing of the cowl, the positioning means do not ensure the positioning of the cowl relative to the rest of the nacelle in a direction that corresponds to the direction of the opening and closing movement of the cowl that corresponds essentially to the radial direction. Consequently, taking into account the distance between the pivoting axis 16 and the locking/unlocking means 17, the cowl 14 can become deformed in the radial direction and can produce a scooping phenomenon.

So as not to alter its aerodynamic characteristics, the nacelle comprises means 19 for limiting the deformation of the cowl and the appearance of the scooping phenomenon.

FIGS. 2A, 2B, 3 to 5 show in a cutaway—in a plane that contains the longitudinal axis of the power plant—the upstream edge 18 of the cowl that works with the upstream edge 20 of the opening. The latter comprises an offset 22 that makes it possible to house the end of the edge 18 of the cowl in such a way that the outside surface of the cowl is arranged in the extension of the outside surface of the rest of the nacelle.

The opening is delimited by a frame that comprises a wall 24 at the upstream edge that is perpendicular or tilted relative to the outside surfaces of the nacelle.

According to the invention, the means 19 for limiting the appearance of the scooping phenomenon comprise at least one lock 26 that is integral with the frame of the opening (more generally with the rest of the nacelle), one part of which is able to occupy a so-called locked state in which the lock part interferes with the cowl 14 and prevents a deformation that comprises a radial component of said cowl and another so-called free state in which said lock part 26 no longer interferes with the cowl and allows the opening movement of said cowl.

According to an important point of the invention, the lock 26 is of the pneumatic type, namely the switch from one state to the next is generated by a pressure variation of a gas.

As a variant, the lock could be integral with the cowl.

If appropriate, the nacelle 10 can comprise one or more locks 26 arranged in the zones at which the scooping phenomena are likely to appear, in particular at zones located approximately at 3 o'clock and/or at 9 o'clock.

According to a first embodiment that is illustrated in FIGS. 2A and 2B, the lock 26 comprises a rod 28 that is guided in translation by a bearing 30 in the form of a tube that is integral with the wall 24 of the frame of the opening, whereby said rod 28 moves translationally in a direction that is secant to the radial direction. Preferably, the rod can move translationally in a direction that is contained in a longitudinal plane and that makes an angle of greater than 60° relative to the radial direction.

According to the variant that is illustrated in FIGS. 2A and 2B, the bearing 30 is attached at the inside surface of the wall 24 and passes through said wall 24 via an opening 32. The rod 28 comprises a first end 34 that can work with an opening 36 that is made in a wall 38 that is integral with the cowl.

The bearing 30, and the openings 32 and 36 are arranged in such a way as to be aligned when the cowl is closed correctly. Likewise, the bearing 30 and the opening 36 have cross-sections that are adapted to those of the rod in such a way that the rod 28 can slide without play or with a very slight play relative to the bearing 30 and the opening 36.

Advantageously, the first end 34 is rounded to facilitate the centering of the rod 28 relative to the opening 36.

The rod 28 can slide between a first locked state in which it interferes with the wall 38 and passes through the opening 36 and a second free state in which it does not interfere with the wall 38 and does not pass through the opening 36.

At its second end, the rod 28 comprises a collar 40 that acts as a stop.

Return means are provided for keeping the rod 28 in the free state. According to one embodiment, a compression spring 42 is inserted between the collar 40 and the wall 24 or the bearing 30.

To ensure the switch from the free state to the locked state and holding it in the locked state, the nacelle comprises at least one control.

According to the variant that is illustrated in FIGS. 2A and 2B, the control is a membrane 44 in the form of a bladder whose volume can vary based on the pressure that is present in the interior of said bladder.

This membrane 44 comprises a part that is inserted between the second end of the rod 28 and a stop in such a way that the membrane 44 exerts a force against the return means 42 and generates the switch to and/or the holding in the locked state of the rod 28 when the pressure that is applied to the membrane 44 is greater than a given threshold. Thus, when the pressure in the interior of the bladder is greater than the given threshold, then the lock is in the locked state, as illustrated in FIG. 2A. In contrast, when the pressure inside the bladder is less than a given threshold, then the lock is in the free state because of the action of the return means 42, as illustrated in FIG. 2B.

To ensure the operation of the lock, the nacelle comprises means for supplying the control with compressed air.

According to a first variant that is illustrated in FIGS. 2A, 2B and 3, the nacelle—at its outside wall—can comprise a tap 46 that is connected to the bladder 44, whereby said tap is tilted in such a way as to allow the filling of the bladder when the aircraft is in flight.

Thus, the pressure inside the bladder increases with the speed of the aircraft. This arrangement makes it possible to obtain a naturally-controlled supply of air. Actually, the switch to the locked state is done when the speed of the aircraft exceeds a predetermined value, with the scooping phenomena appearing at speeds that are greater than said predetermined value.

According to another variant, the control can be supplied by another tap 46' (in broken lines in FIGS. 2A, 2B, 3 and 4) by sampling air at the throat or the engine channel or any other pressurized gas at pressurized pipes of the power plant. In this case, it is advisable to provide means 48 for controlling the supply, for example a motorized valve.

However, the invention is not limited to the embodiments specified above but covers all of the variants thereof relative to the means for supplying the control.

FIG. 3 showed another variant that is close to the one described in FIGS. 2A and 2B. According to this variant, the rod 28 can move translationally in a direction that is perpendicular to the radial direction. According to another difference, the control comes in the form of a membrane 44 that delimits a cavity into which pressurized air is injected. The pressure variation in the interior of said cavity deforms the membrane 44 that then moves the lock against the return means.

According to the preceding variants, the lock and the control are two separate elements.

FIGS. 4 and 5 show other variants for which the lock and the control are connected, and a single piece is formed.

According to the variant that is illustrated in FIG. 4, the lock is integral with a membrane 44 and comes in the form of a rod 28 that may or may not work with the opening 36 that is made in the wall 38 that is integral with the cowl 14.

To ensure the return and its being held in the free state, the membrane 44 can come in the form of a bellows and can be made of an elastic material, preferably with shape memory, where the unstressed shape of the membrane corresponds to that which it occupies in the free state.

As for the variant illustrated in FIG. 3, the membrane 44 delimits a cavity 56 that can be supplied with pressurized gas. When the pressure exceeds a certain threshold in the cavity 56, the membrane 44 becomes deformed, which is manifested by the engagement of the rod 28 in the opening 36.

According to this variant, the lock preferably moves translationally in a direction that is perpendicular to the radial direction.

According to a variant that is illustrated in FIG. 5, the control and the lock come in the form of a membrane 44 and more specifically a flange that extends over at least a part of the edge that is upstream from the opening, which is immobilized in a radial direction relative to the frame of the opening and which, when the pressure in the interior of the flange exceeds a certain threshold, works with a groove 60 that is made on at least a part of the edge that is upstream from the cowl and open toward the front of the nacelle and prevents the deformation of said cowl by limiting its movement in the radial direction.

Advantageously, the wall 24 of the frame of the opening also comprises a groove 62 opposite the groove 60 for immobilizing the flange relative to the frame in the radial direction.

Thus, when the pressure in the interior of the flange exceeds a certain threshold, a part of the flange is engaged in the groove 60 and prevents a radial deformation of the cowl.

In contrast, when the pressure in the interior of the flange is not adequate, the flange is not rigid enough to immobilize the cowl, which can then be maneuvered.

The invention claimed is:

1. An aircraft nacelle (10) having an outside wall with a cowl (14) that moves relative to the rest of the nacelle (10) in such a way as to block or unblock an opening, said cowl (14) comprising:
    an articulation (15) relative to the rest of the nacelle (10) and a latch (17) opposite the articulation for holding said cowl (14); and
    means (19) for limiting the appearance of scooping phenomena, said means (19) for limiting the appearance of the scooping phenomenon comprising at least one lock (26) that is integral with the rest of the nacelle (10) or respectively the cowl (14) and that occupies a locked state in which a part of the lock (26) interferes with the cowl (14) or respectively the rest of the nacelle (10) and prevents a deformation that comprises a radial component of said cowl (14) and a free state in which said part of the lock (26) no longer interferes with the cowl (14) or respectively the rest of the nacelle (10) and allows the opening movement of said cowl (14),
    wherein the at least one lock comprises a membrane arranged to receive a gas so as to switch the at least one lock between the locked and free states by a pressure variation of the gas.

2. The aircraft nacelle according to claim 1, wherein the membrane (44) is upstream from the opening and is arranged to move in response to the pressure variation of the gas and to expand into and withdraw from a first groove (60) that is upstream from the cowl (14) and open toward a front of the nacelle (10) so as to switch the at least one lock between the locked and free states.

3. The aircraft nacelle according to claim 2, further comprising a second groove (62) opposite the first groove (60) and that receives the membrane.

4. The aircraft nacelle according to claim 1, wherein the at least one lock (26) comprises a rod (28) that is guided in translation in a direction that is contained in a longitudinal plane and that makes an angle that is greater than 60° relative to the radial direction.

5. The aircraft nacelle according to claim 4, wherein the membrane (44) expands and contracts by operation of the pressure variation of the gas to move the rod (28), the rod being movable in an opening (36) in a wall (38) that is integral with the cowl (14).

6. The aircraft nacelle according to claim 5, wherein the membrane (44) is a bellows comprising an elastic material.

7. The aircraft nacelle according to claim 1, the at least one lock comprising a spring (42) for placing the lock (26) in the free state, wherein the membrane expands against the spring by operation of the pressure variation of the gas to place the lock (26) in the locked state.

8. The aircraft nacelle according to claim 7, further comprising a tap (46) at an outside surface of the nacelle and that is connected to the membrane to supply the gas.

9. The aircraft nacelle according to claim 7, further comprising a tap (46') inside the nacelle and connected to the membrane to supply the gas.

10. The aircraft nacelle according to claim 7, further comprising a tap (46') at a pressurized duct of a power plant and connected to the membrane to supply the gas.

* * * * *